United States Patent
Roh et al.

(10) Patent No.: US 10,269,503 B2
(45) Date of Patent: Apr. 23, 2019

(54) LITHIUM-SULFUR ULTRACAPACITOR AND MANUFACTURING METHOD OF THE SAME

(71) Applicant: KOREA INSTITUTE OF CERAMIC ENGINEERING AND TECHNOLOGY, Gyeongsangnam-do (KR)

(72) Inventors: Kwang Chul Roh, Gyeongsangnam-do (KR); Dae Soo Jung, Gyeongsangnam-do (KR); Mok-Hwa Kim, Gyeongsangnam-do (KR)

(73) Assignee: KOREA INSTITUTE OF CERAMIC ENGINEERING AND TECHNOLOGY, Gyeongsangnam-do (KR)

( * ) Notice: Subject to any disclaimer, the term of this patent is extended or adjusted under 35 U.S.C. 154(b) by 0 days.

(21) Appl. No.: 15/359,743

(22) Filed: Nov. 23, 2016

(65) Prior Publication Data
US 2017/0323735 A1 Nov. 9, 2017

(30) Foreign Application Priority Data
May 3, 2016 (KR) .................. 10-2016-0054395

(51) Int. Cl.
*H01G 11/06* (2013.01)
*H01G 11/26* (2013.01)
(Continued)

(52) U.S. Cl.
CPC ............. *H01G 11/06* (2013.01); *H01G 11/24* (2013.01); *H01G 11/26* (2013.01); *H01G 11/32* (2013.01);
(Continued)

(58) Field of Classification Search
CPC ........ H01G 11/06; H01G 11/32; H01G 11/38; H01G 11/52; H01G 11/62; H01G 11/74; H01G 11/82
See application file for complete search history.

(56) References Cited

U.S. PATENT DOCUMENTS

2005/0260497 A1* 11/2005 Kumashiro ......... B60L 11/1896
429/231.8
2008/0297981 A1* 12/2008 Endo ...................... H01G 9/038
361/502
(Continued)

FOREIGN PATENT DOCUMENTS

KR   10-2011-0062576   6/2011
KR       20120051886 A   5/2012
(Continued)

OTHER PUBLICATIONS

Wang, et al., "Polymer lithium cells with sulfur composites as cathode materials", www.ScienceDirect.com, Mar. 17, 2003, 7 pages, Electrochimica Acta 48 (2003) 1861-1867, 2003 Elsevier Science Ltd.

*Primary Examiner* — Nguyen T Ha
(74) *Attorney, Agent, or Firm* — Miller, Matthias & Hull LLP

(57) ABSTRACT

The present invention relates to a lithium-sulfur ultracapacitor including a cathode containing a sulfur-porous carbon composite material; a separator; a lithium metal electrode disposed on an opposite side of the cathode with respect to the separator; a graphite-based electrode disposed adjacent to the lithium metal electrode; and an electrolyte impregnating the cathode, the lithium metal electrode, and the graphite-based electrode, wherein the lithium metal electrode and the graphite-based electrode together constitute an anode, and a method of preparing the lithium-sulfur ultracapacitor. According to the present invention, since the
(Continued)

lithium metal electrode and the graphite-based electrode are adjacent to each other, lithium ions arising from the lithium metal electrode are pre-doped on the graphite-based electrode due to an internal short circuit between the lithium metal electrode and the graphite-based electrode, migrate from the graphite-based electrode to the cathode during a discharging process, and migrate from the cathode to the graphite-based electrode during a charging process, and such migrations contribute to excellent charging and discharging properties of the lithium-sulfur ultracapacitor.

6 Claims, 5 Drawing Sheets

(51) Int. Cl.
| | |
|---|---|
| *H01G 11/32* | (2013.01) |
| *H01G 11/38* | (2013.01) |
| *H01G 11/52* | (2013.01) |
| *H01G 11/62* | (2013.01) |
| *H01G 11/74* | (2013.01) |
| *H01G 11/86* | (2013.01) |
| *H01G 11/24* | (2013.01) |
| *H01G 11/34* | (2013.01) |
| *H01G 11/50* | (2013.01) |
| *H01G 11/82* | (2013.01) |

(52) U.S. Cl.
CPC .............. *H01G 11/34* (2013.01); *H01G 11/38* (2013.01); *H01G 11/50* (2013.01); *H01G 11/52* (2013.01); *H01G 11/62* (2013.01); *H01G 11/74* (2013.01); *H01G 11/82* (2013.01); *H01G 11/86* (2013.01)

(56) References Cited

U.S. PATENT DOCUMENTS

| | | | |
|---|---|---|---|
| 2011/0052985 A1* | 3/2011 | Kashiwazaki | H01G 11/38 429/217 |
| 2012/0075771 A1* | 3/2012 | Jin | H01G 11/06 361/503 |
| 2013/0045427 A1* | 2/2013 | Zhamu | H01M 4/38 429/403 |
| 2014/0170476 A1* | 6/2014 | Tan | H01M 4/131 429/188 |
| 2014/0248531 A1* | 9/2014 | Tan | B82Y 30/00 429/188 |
| 2015/0303451 A1* | 10/2015 | Miki | C22C 13/00 429/231.8 |
| 2016/0190561 A1* | 6/2016 | Son | H01M 4/366 429/199 |

FOREIGN PATENT DOCUMENTS

| | | |
|---|---|---|
| KR | 20150117261 A | 10/2015 |
| KR | 20160046775 A | 4/2016 |

\* cited by examiner

LITHIUM-SULFUR ULTRACAPACITOR AND MANUFACTURING METHOD OF THE SAME

CROSS-REFERENCE TO RELATED APPLICATION

This application claims priority to and the benefit of Korean Patent Application No. 10-2016-0054395, filed on May 3, 2016, the disclosure of which is incorporated herein by reference in its entirety.

BACKGROUND

1. Field of the Invention

The present invention relates to a lithium-sulfur ultracapacitor and a method of preparing the same, and more particularly, to a lithium-sulfur ultracapacitor including a lithium metal electrode and a graphite-based electrode that are adjacent to each other and a cathode composed of a porous carbon material containing sulfur and a method of preparing the lithium-sulfur ultracapacitor, wherein, since the lithium metal electrode and the graphite-based electrode are adjacent to each other, lithium ions arising from the lithium metal electrode are pre-doped on the graphite-based electrode due to an internal short circuit between the lithium metal electrode and the graphite-based electrode, migrate from the graphite-based electrode to the cathode during a discharging process, and migrate from the cathode to the graphite-based electrode during a charging process, and such migrations contribute to excellent charging and discharging properties of the lithium-sulfur ultracapacitor.

2. Discussion of Related Art

In general, ultracapacitors are also known as electric double-layer capacitors (EDLCs) or supercapacitors, make use of electrodes, an electrical conductor, and a pair of charge layers with opposite polarities (an electric double layer) formed at an interface between the electrical conductor and an electrolyte solution impregnating the same, and are devices that do not require maintenance due to a low risk of deterioration resulting from repetitive charging/discharging operations. Therefore, ultracapacitors are mainly used to back up integrated circuits (ICs) in various electric and electronic devices, and the applications thereof have been broadened recently to include various fields, such as toys, solar power storage, and hybrid electric vehicle (HEV) power sources.

Such ultracapacitors generally include two electrodes, i.e. a cathode and an anode, impregnated with an electrolyte; a porous separator disposed between the two electrodes, enabling ion migrations only and preventing short circuits; a gasket for preventing electrolyte leakages and short circuits; and a case enclosing all of the above.

The performance of ultracapacitors having the aforementioned structure is determined by the electrode active material, the electrolyte, or the like. In particular, main performances thereof such as capacitance are determined mostly by the electrode active material.

The recent broadening of the applications of ultracapacitors requires ultracapacitors to have better charging and discharging properties. Therefore, the development of ultracapacitors which meet such a requirement is desired.

SUMMARY OF THE INVENTION

The present invention is directed to providing a lithium-sulfur ultracapacitor including a lithium metal electrode and a graphite-based electrode adjacent to each other and a cathode composed of a porous carbon material containing sulfur and a method of preparing the lithium-sulfur ultracapacitor, wherein, since the lithium metal electrode and the graphite-based electrode are adjacent to each other, lithium ions arising from the lithium metal electrode are pre-doped on the graphite-based electrode due to an internal short circuit between the lithium metal electrode and the graphite-based electrode, migrate from the graphite-based electrode to the cathode during a discharging process, and migrate from the cathode to the graphite-based electrode during a charging process, and such migrations contribute to excellent charging and discharging properties of the lithium-sulfur ultracapacitor.

The present invention provides a lithium-sulfur ultracapacitor including a cathode containing a sulfur-porous carbon composite material; a separator; a lithium metal electrode disposed on an opposite side of the cathode with respect to the separator; a graphite-based electrode disposed adjacent to the lithium metal electrode; and an electrolyte impregnating the cathode, the lithium metal electrode, and the graphite-based electrode, wherein the lithium metal electrode and the graphite-based electrode together constitute an anode.

The cathode includes the sulfur-porous carbon composite material as a cathode active material, wherein the sulfur-porous carbon composite material contains a porous carbon material having a plurality of pores that provide channels through which lithium ions are introduced or discharged and sulfur adsorbed onto a surface and pores of the porous carbon material, and sulfur is preferably contained at 1.0 to 35.0% by weight of the sulfur-porous carbon composite material.

The cathode may be a sheet-type electrode including the cathode active material, a conductive material, and a binder, wherein the conductive material is preferably included at 1 to 35 parts by weight with respect to 100 parts by weight of the cathode active material, and the binder is preferably included at 1 to 25 parts by weight with respect to 100 parts by weight of the cathode active material.

The porous carbon material preferably has a pore volume of 0.5 to 5.0 $cm^3/g$.

The graphite-based electrode includes a graphite-based powder as an electrode active material, wherein the graphite-based powder may be based on natural graphite, artificial graphite, soft-carbon-based graphite, hard-carbon-based graphite, or a mixture thereof, and the graphite-based powder preferably has an average particle diameter of 0.5 to 20 μm.

The graphite-based electrode may be a sheet-type electrode including the electrode active material, a conductive material, and a binder, wherein the conductive material is preferably included at 1 to 35 parts by weight with respect to 100 parts by weight of the electrode active material, and the binder is preferably included at 1 to 25 parts by weight with respect to 100 parts by weight of the electrode active material.

The lithium metal electrode may be a flat, plate-like electrode, and the area of the graphite-based electrode and the area of the lithium metal electrode preferably differ by less than 10%.

The electrolyte may be an electrolyte in which a lithium salt is dissolved in a non-aqueous solvent at a concentration of 0.1 to 2.0 M, wherein the lithium salt may be $LiPF_6$, $LiBF_4$, $LiSbF_6$, $LiAsF_6$, $LiClO_4$, $LiNO_3$, $LiCF_3SO_3$, LiN ($CF_3SO_2)_2$ (lithium bis(trifluoromethanesulfonyl)imide (LiTFSI)), $LiN(C_2F_5SO_2)_2$, $LiAlO_4$, $LiAlCl_4$, or a mixture thereof.

In addition, the present invention provides a method of preparing a lithium-sulfur ultracapacitor, wherein the method includes preparing a cathode using a sulfur-porous carbon composite material as a cathode active material; preparing a graphite-based electrode using a graphite-based powder as an electrode active material; disposing the cathode, a separator, a lithium metal electrode, and the graphite-based electrode inside a case; and injecting an electrolyte such that the cathode, the lithium metal electrode, and the graphite-based electrode are impregnated with the electrolyte and sealing the case, wherein the lithium metal electrode is disposed on an opposite side of the cathode with respect to the separator, the graphite-based electrode is disposed adjacent to the lithium metal electrode, and the lithium metal electrode and the graphite-based electrode constitute an anode.

The sulfur-porous carbon composite material may be prepared by a method including mixing a porous carbon material and sulfur; and heat-treating the mixture under an inert atmosphere at a temperature higher than the melting point and lower than the boiling point of sulfur. The sulfur-porous carbon composite material contains a porous carbon material having a plurality of pores that provide channels through which lithium ions are introduced or discharged and sulfur adsorbed onto a surface and pores of the porous carbon material, wherein sulfur is preferably contained at 1.0 to 35.0% by weight of the sulfur-porous carbon composite material.

The process of preparing a cathode may include preparing a cathode composition by mixing the cathode active material, the conductive material, the binder, and a dispersion medium; forming the cathode composition into a sheet; drying the cathode composition, which has been formed into a sheet, at a temperature in a range of 80° C. to 350° C.; and forming a sheet-type electrode by punching or cutting the cathode composition, which has been dried, into a desired size, wherein the conductive material is preferably mixed at 1 to 35 parts by weight with respect to 100 parts by weight of the cathode active material, and the binder is preferably mixed at 1 to 25 parts by weight with respect to 100 parts by weight of the cathode active material.

The porous carbon material preferably has a pore volume of 0.5 to 5.0 $cm^3/g$.

The process of preparing the graphite-based electrode may include preparing a graphite-based electrode composition by mixing the electrode active material, the conductive material, the binder, and a dispersion medium; forming the graphite-based electrode composition into a sheet; drying the graphite-based electrode composition, which has been formed into a sheet, at a temperature in a range of 80° C. to 350° C.; and forming a sheet-type electrode by punching or cutting the graphite-based electrode composition, which has been dried, into a desired size. The conductive material is preferably mixed at 1 to 35 parts by weight with respect to 100 parts by weight of the electrode active material, the binder is preferably mixed at 1 to 25 parts by weight with respect to 100 parts by weight of the electrode active material, and the electrode active material includes a graphite-based powder, wherein the graphite-based powder may be based on natural graphite, artificial graphite, soft-carbon-based graphite, hard-carbon-based graphite, or a mixture thereof, and the graphite-based powder preferably has an average particle diameter of 0.5 to 20 μm.

A flat, plate-like electrode may be used as the lithium metal electrode, and the area of the graphite-based electrode and the area of the lithium metal electrode preferably differ by less than 10%.

An electrolyte in which a lithium salt is dissolved in a non-aqueous solvent at a concentration of 0.1 to 2.0 M may be used as the electrolyte, wherein the lithium salt may be $LiPF_6$, $LiBF_4$, $LiSbF_6$, $LiAsF_6$, $LiClO_4$, $LiNO_3$, $LiCF_3SO_3$, LiTFSI, $LiN(C_2F_5SO_2)_2$, $LiAlO_4$, $LiAlCl_4$, or a mixture thereof.

According to the lithium-sulfur ultracapacitor of the present invention, the cathode is composed of a porous carbon material containing sulfur, and, since the lithium metal electrode and the graphite-based electrode are adjacent to each other, lithium ions arising from the lithium metal electrode are pre-doped on the graphite-based electrode due to an internal short circuit between the lithium metal electrode and the graphite-based electrode, migrate from the graphite-based electrode to the cathode during a discharging process, and migrate from the cathode to the graphite-based electrode during a charging process, and such migrations contribute to excellent charging and discharging properties of the lithium-sulfur ultracapacitor.

Since sulfur having high theoretical capacitance and low conductivity forms a composite material with a porous carbon material, the composite material offers enhanced capacitance compared to a cathode active material composed only of the porous carbon material and significantly enhanced conductivity compared to a cathode active material composed only of sulfur, thus enhancing the electrochemical performance. In addition, since most of the sulfur is disposed inside the pores of the porous carbon material by being adsorbed onto the same, the elution of lithium polysulfide, which is an intermediate product produced during an electrochemical reaction of the lithium-sulfur ultracapacitor, into the electrolyte can be minimized and thus the lifespan property of the lithium-sulfur ultracapacitor can be improved. Since the porous carbon material has a high pore volume, the content of sulfur to be included in the cathode active material can be adjusted.

The cathode active material has a large specific surface area by exhibiting porosity, and the porosity is due to a plurality of pores that are present on a surface and in the bulk of the particles. Therefore, through the plurality of pores, lithium ions are physically adsorbed onto or desorbed from both the surface and bulk of the particles actively during charging or discharging operations, thus leading to the realization of excellent capacitance. Also, the reaction active site with the electrolyte can be maximized due to the porous structure, resulting in an improved power density.

In addition, the preparation of the cathode active material can be carried out in a simple manner, is economical since inexpensive starting materials can be used, and can be scaled up for mass production due to the simplicity of the process.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
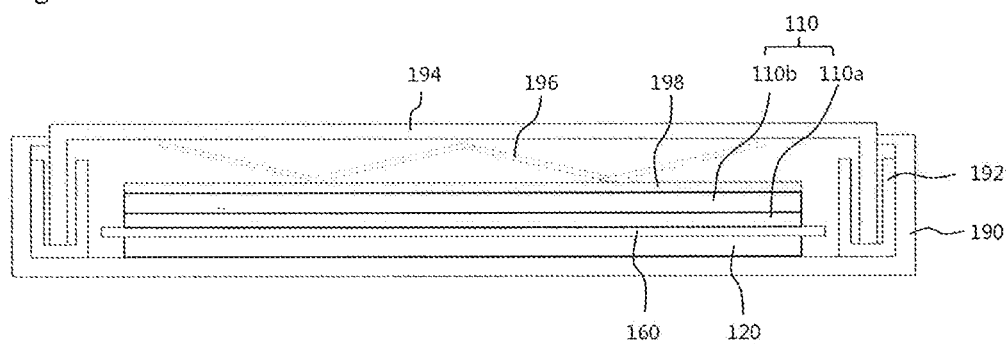
FIG. 1 illustrates a lithium-sulfur ultracapacitor according to one exemplary embodiment of the present invention.

Hereinafter, exemplary embodiments according to the present invention will be described in detail with reference to accompanying drawings. However, the following embodiments are provided to facilitate overall understanding of the present invention for those skilled in the art and may be modified in several different forms, and the scope of the present invention is not limited to the embodiments to be described below. In describing each of the drawings, like reference numerals are used to refer to like elements.

Hereinafter, the term "bulk" refers to the interior portion underneath the surface of a particle and refers to all portions of the particle other than the surface.

The lithium-sulfur ultracapacitor according to an exemplary embodiment of the present invention includes a cathode including a sulfur-porous carbon composite material; a separator; a lithium metal electrode disposed on the opposite side of the cathode with respect to the separator; a graphite-based electrode disposed adjacent to the lithium metal electrode; and an electrolyte impregnating the cathode, the lithium metal electrode, and the graphite-based electrode, wherein the lithium metal electrode and the graphite-based electrode constitute an anode.

The cathode includes the sulfur-porous carbon composite material as a cathode active material, wherein the sulfur-porous carbon composite material contains a porous carbon material having a plurality of pores that provide channels through which lithium ions are introduced or discharged and sulfur adsorbed onto a surface and pores of the porous carbon material, and sulfur is preferably contained at 1.0 to 35.0% by weight of the sulfur-porous carbon composite material.

The cathode may be a sheet-type electrode including the cathode active material, a conductive material, and a binder, wherein the conductive material is preferably included at 1 to 35 parts by weight with respect to 100 parts by weight of the cathode active material, and the binder is preferably included at 1 to 25 parts by weight with respect to 100 parts by weight of the cathode active material.

The porous carbon material preferably has a pore volume of 0.5 to 5.0 $cm^3/g$.

The graphite-based electrode includes a graphite-based powder as an electrode active material, wherein the graphite-based powder may be based on natural graphite, artificial graphite, soft-carbon-based graphite, hard-carbon-based graphite, or a mixture thereof, and the graphite-based powder preferably has an average particle diameter of 0.5 to 20 μm.

The graphite-based electrode may be a sheet-type electrode including the electrode active material, a conductive material, and a binder, wherein the conductive material is preferably included at 1 to 35 parts by weight with respect to 100 parts by weight of the electrode active material, and the binder is preferably included at 1 to 25 parts by weight with respect to 100 parts by weight of the electrode active material.

The lithium metal electrode may be a flat, plate-like electrode, and the area of the graphite-based electrode and the area of the lithium metal electrode preferably differ by less than 10%.

The electrolyte may be an electrolyte in which a lithium salt is dissolved in a non-aqueous solvent at a concentration of 0.1 to 2.0 M, wherein the lithium salt may be $LiPF_6$, $LiBF_4$, $LiSbF_6$, $LiAsF_6$, $LiClO_4$, $LiNO_3$, $LiCF_3SO_3$, $LiN(CF_3SO_2)_2$ (lithium bis(trifluoromethanesulfonyl)imide (LiTFSI)), $LiN(C_2F_5SO_2)_2$, $LiAlO_4$, $LiAlCl_4$, or a mixture thereof.

The method of preparing the lithium-sulfur ultracapacitor according to an exemplary embodiment of the present invention includes preparing a cathode using a sulfur-porous carbon composite material as a cathode active material; preparing a graphite-based electrode using a graphite-based powder as an electrode active material; disposing the cathode, a separator, a lithium metal electrode, and the graphite-based electrode inside a case; injecting an electrolyte such that the cathode, the lithium metal electrode, and the graphite-based electrode are impregnated with the electrolyte and subsequently sealing the case, wherein the lithium metal electrode is disposed on an opposite side of the cathode with respect to the separator, the graphite-based electrode is disposed adjacent to the lithium metal electrode, and the lithium metal electrode and the graphite-based electrode constitute an anode.

The sulfur-porous carbon composite material may be prepared by a method including mixing a porous carbon material and sulfur; and heat-treating the mixture under an inert atmosphere at a temperature higher than the melting point and lower than the boiling point of sulfur. The sulfur-porous carbon composite material contains a porous carbon material having a plurality of pores that provide channels through which lithium ions are introduced or discharged and sulfur adsorbed onto a surface and pores of the porous carbon material, wherein sulfur is preferably contained at 1.0 to 35.0% by weight of the sulfur-porous carbon composite material.

The process of preparing a cathode may include preparing a cathode composition by mixing the cathode active material, the conductive material, the binder, and a dispersion medium; forming the cathode composition into a sheet; drying the cathode composition, which has been formed into a sheet, at a temperature in a range of 80° C. to 350° C.; and forming a sheet-type electrode by punching or cutting the cathode composition, which has been dried, into a desired size, wherein the conductive material is preferably mixed at 1 to 35 parts by weight with respect to 100 parts by weight of the cathode active material, and the binder is preferably mixed at 1 to 25 parts by weight with respect to 100 parts by weight of the cathode active material.

The porous carbon material preferably has a pore volume of 0.5 to 5.0 $cm^3/g$.

The process of preparing the graphite-based electrode may include preparing a graphite-based electrode composition by mixing the electrode active material, the conductive material, the binder, and a dispersion medium; forming the graphite-based electrode composition into a sheet; drying the graphite-based electrode composition, which has been formed into a sheet, at a temperature in a range of 80° C. to 350° C.; and forming a sheet-type electrode by punching or cutting the graphite-based electrode composition, which has been dried, into a desired size. The conductive material is preferably mixed at 1 to 35 parts by weight with respect to 100 parts by weight of the electrode active material, the binder is preferably mixed at 1 to 25 parts by weight with respect to 100 parts by weight of the electrode active material, the electrode active material includes a graphite-based powder, wherein the graphite-based powder may be based on natural graphite, artificial graphite, soft-carbon-based graphite, hard-carbon-based graphite, or a mixture thereof, and the graphite-based powder preferably has an average particle diameter of 0.5 to 20 µm.

The lithium metal electrode may be a flat, plate-like electrode, and the area of the graphite-based electrode and the area of the lithium metal electrode preferably differ by less than 10%.

The electrolyte may be an electrolyte in which a lithium salt is dissolved in a non-aqueous solvent at a concentration of 0.1 to 2.0 M, wherein the lithium salt may be $LiPF_6$, $LiBF_4$, $LiSbF_6$, $LiAsF_6$, $LiClO_4$, $LiNO_3$, $LiCF_3SO_3$, LiTFSI, $LiN(C_2F_5SO_2)_2$, $LiAlO_4$, $LiAlCl_4$, or a mixture thereof.

Hereinafter, the lithium-sulfur ultracapacitor according to an exemplary embodiment of the present invention and the method of preparing the same will be described in greater detail.

FIG. 1 illustrates a lithium-sulfur ultracapacitor according to one exemplary embodiment of the present invention. In FIG. 1, the reference numeral 190 corresponds to a case, the reference numeral 192 corresponds to a gasket for preventing electrolyte leakages and providing sealing, the reference numeral 194 corresponds to a cap for covering the upper portion of the case 190, the reference numeral 196 corresponds to a washer that absorbs shock, the reference numeral 198 corresponds to a spacer provided between the washer 196 and the anode 110, and the reference numeral 160 is a porous separator for preventing a short circuit between the cathode 120 and the anode 110.

Referring to FIG. 1, the lithium-sulfur ultracapacitor according to an exemplary embodiment of the present invention includes a cathode 120 including a sulfur-porous carbon composite material; a separator 160, which is porous; a lithium metal electrode 110a disposed on the opposite side of the cathode 120 with respect to the separator 160; a graphite-based electrode 110b disposed adjacent to the lithium metal electrode 110a; an electrolyte impregnating the cathode 120, the lithium metal electrode 110a, and the graphite-based electrode 110b, wherein the lithium metal electrode 110a and the graphite-based electrode 110b constitute an anode 110.

The cathode 120 includes a sulfur-porous carbon composite material as a cathode active material. The sulfur-porous carbon composite material contains a porous carbon material having a plurality of pores that provide channels through which lithium ions are introduced or discharged and sulfur adsorbed onto a surface and pores of the porous carbon material. Sulfur is preferably contained at 1.0 to 35.0% by weight of the sulfur-porous carbon composite material.

The cathode 120 may be a sheet-type electrode including the cathode active material, a conductive material, and a binder, wherein the conductive material is preferably contained at 1 to 35 parts by weight with respect to 100 parts by weight of the cathode active material, and the binder is preferably contained at 1 to 25 parts by weight with respect to 100 parts by weight of the cathode active material. The cathode 120 preferably has a thickness in a range of 10 to 500 µm. The capacitance of such a cathode 120 is realized through physical adsorption and desorption of lithium ions.

The cathode active material is a sulfur-porous carbon composite material, which is a porous carbon material containing sulfur and having a structure in which sulfur is adsorbed (or deposited) onto the porous carbon material, wherein sulfur is contained at 1.0 to 35.0% by weight of the sulfur-porous carbon composite material. The porous carbon material preferably has a pore volume of 0.5 to 5.0 $cm^3/g$. The porous carbon material may be porous activated carbon, a carbon nanotube (CNT), a carbon nanofiber (CNF), graphene, expanded graphite, or a mixture thereof.

Sulfur used in the cathode active material has an advantage of a very low price but also exhibits low conductivity. When the cathode active material is prepared solely of sulfur, the electrochemical performance may be poor due to low conductivity, and lithium polysulfide, which is an intermediate product, may be produced in a large amount during an electrochemical reaction in the lithium-sulfur ultracapacitor. When eluted into the electrolyte, lithium polysulfide dissolves in the electrolyte. Lithium polysulfide eluted into the electrolyte in a large amount may cause the lithium-sulfur ultracapacitor to have a reduced lifespan.

As the cathode active material, a composite material prepared by combining sulfur and a porous carbon material, which allows ions and electrons to actively migrate, is used. The sulfur-porous carbon composite material may be prepared by mixing a porous carbon material powder and a sulfur powder in a ball mill or the like and heat-treating the mixture under an inert atmosphere.

Since sulfur having high theoretical capacitance and low conductivity forms a composite material with a porous carbon material in the cathode active material, the cathode active material offers enhanced capacitance compared to a cathode active material composed only of the porous carbon material and significantly enhanced conductivity compared to a cathode active material composed only of sulfur, and thus enhances the electrochemical performance. In addition, since most of the sulfur is disposed inside the pores of the porous carbon material by being adsorbed onto the same, the elution of lithium polysulfide, which is an intermediate product produced during an electrochemical reaction of the lithium-sulfur ultracapacitor, into the electrolyte can be minimized, and thus the lifespan of the lithium-sulfur ultracapacitor can be improved.

The graphite-based electrode 110b contains a graphite-based powder as the electrode active material. The graphite-based powder may be based on natural graphite, artificial graphite, soft-carbon-based graphite, hard-carbon-based graphite, or a mixture thereof. The graphite-based powder preferably has an average particle diameter of 0.5 to 20 µm. The artificial graphite is prepared by mixing a coke (a solid carbon fuel prepared through the dry distillation of coal) powder and a binder, carbonizing the mixture by baking, and reheating the carbonized substances at a temperature in a range of 2,500 to 3,000° C. in an electric furnace, and is a highly crystalline carbon material. The soft-carbon-based graphite and the hard-carbon-based graphite are low crystalline carbon materials. The soft-carbon-based graphite is a carbon material that easily graphitizes by heat-treating at a temperature in a range of 1,800 to 2,000° C. due to small graphite crystals clustered in an orderly manner. The hard-carbon-based graphite is a carbon material containing small graphite crystals clustered in a disorderly fashion, and thus cannot easily graphitize any further and form a layered structure.

The graphite-based electrode 110b may be a sheet-type electrode including the electrode active material, a conductive material, and a binder, wherein the conductive material is preferably contained at 1 to 35 parts by weight with respect to 100 parts by weight of the electrode active material, and the binder is preferably contained at 1 to 25 parts by weight with respect to 100 parts by weight of the electrode active material. The graphite-based electrode 110b preferably has a thickness in a range of about 10 to 500 μm. Such a graphite-based electrode 110b experiences chemical reactions caused by lithium ion insertion and elimination reactions.

The lithium metal electrode 110a may be a flat, plate-like electrode, and the area of the graphite-based electrode 110b and the area of the lithium metal electrode 110a preferably differ by less than 10%. The lithium metal electrode 110a preferably has a thickness in a range of 10 to 500 μm.

The separator 160 is not limited to a particular type, as long as it is a separator commonly used in the field of ultracapacitors. Examples of such a separator include polyethylene nonwoven fabrics, polypropylene nonwoven fabrics, polyester nonwoven fabrics, porous polyacrylonitrile separators, porous poly(vinylidene fluoride-co-hexafluoropropane) copolymeric separators, porous cellulose separators, kraft paper, and rayon fibers.

The electrolyte may be an electrolyte in which a lithium salt is dissolved in a non-aqueous solvent at a concentration of 0.1 to 2.0 M, and the lithium salt may be $LiPF_6$, $LiBF_4$, $LiSbF_6$, $LiAsF_6$, $LiClO_4$, $LiNO_3$, $LiCF_3SO_3$, LiTFSI, $LiN(C_2F_5SO_2)_2$, $LiAlO_4$, $LiAlCl_4$, or a mixture thereof.

The non-aqueous solvent is not limited to a particular type, and examples of the non-aqueous solvent include cyclic carbonate-based solvents, chain carbonate-based solvents, ester-based solvents, ether-based solvents, nitrile-based solvents, amide-based solvents, or mixtures thereof. The cyclic carbonate-based solvent may be ethylene carbonate, propylene carbonate, butylene carbonate, vinylene carbonate, or the like, the chain carbonate-based solvent may be dimethyl carbonate, methyl ethyl carbonate, diethyl carbonate, or the like, the ester-based solvent may be methyl acetate, ethyl acetate, propyl acetate, methyl propionate, ethyl propionate, γ-butyrolactone, or the like, and the ether-based solvent may be 1,2-dimethoxyethane, 1,2-diethoxyethane, tetrahydrofuran, 1,2-dioxane, 2-methyl tetrahydrofuran, dioxolane, or the like, the nitrile-based solvent may be acetonitrile or the like, the amide-based solvent may be dimethylformamide or the like.

As illustrated in FIG. 1, a cap 194 for covering an upper portion of a case 190 and a gasket 192 for preventing electrolyte leakages and providing sealing may be provided. A washer 196 for absorbing shock may be provided below the cap 194, and a spacer 198 may be provided between the washer 196 and the anode 110.

In the case of the lithium-sulfur ultracapacitor according to an exemplary embodiment of the present invention, since the lithium metal electrode 110a and the graphite-based electrode 110b are adjacent to each other, lithium ions arising from the lithium metal electrode 110a are pre-doped on the graphite-based electrode 110b due to an internal short circuit between the lithium metal electrode 110a and the graphite-based electrode 110b, migrate from the graphite-based electrode 110b to the cathode 120 during a discharging process, and migrate from the cathode 120 to the graphite-based electrode 110b during a charging process.

Hereinafter, the method of preparing the lithium-sulfur ultracapacitor according to an exemplary embodiment of the present invention will be described in greater detail.

The cathode 120 is prepared using the sulfur-porous carbon composite material as the cathode active material.

First, a method of preparing the cathode active material (sulfur-porous carbon composite material) will be described in greater detail.

The amount of sulfur to be adsorbed (or deposited) onto the porous carbon material may be adjusted according to the pore volume of the porous carbon material, and the capacitance may be improved according to the amount of sulfur adsorbed (or deposited) onto the pores of the porous carbon material. However, when the pore volume of the porous carbon material is low, only a small amount of sulfur can be adsorbed (or deposited) onto the porous carbon material, and, when such a porous carbon material is used in a lithium-sulfur ultracapacitor, only a limited degree of capacitance improvement will be provided by the ion adsorption or desorption. The porous carbon material preferably has a pore volume of about 0.5 to 5.0 $cm^3/g$, which is high enough to allow sulfur to be adsorbed or deposited onto the porous carbon material at 1.0 to 35% by weight and enable the capacitance enhancement of the lithium-sulfur ultracapacitor accordingly. The porous carbon material may be porous activated carbon, CNTs, CNFs, graphene, expanded graphite, a mixture thereof, or the like.

The porous carbon material is mixed with sulfur, and the mixture is heat-treated at a temperature higher than the melting point and lower than the boiling point of sulfur. The heat treatment is preferably performed under an inert atmosphere such as a nitrogen ($N_2$) or an argon (Ar) atmosphere. Sulfur has a melting point of about 115.21° C. and a boiling point of about 444.6° C. When the heat treatment is conducted by heating to a temperature higher than the melting point of sulfur (for example, at 120 to 200° C.), the heat treatment melts sulfur such that sulfur can be adsorbed (or deposited) onto the porous carbon material. Besides being adsorbed onto a surface of the porous carbon material, sulfur penetrates into pores of the porous carbon material as a result of the heat treatment. Since the porous carbon material includes a number of pores and a cathode active material containing sulfur adsorbed or deposited onto pores as well as on a surface of the porous carbon material is prepared, the capacitance of the lithium-sulfur ultracapacitor can be improved.

The cathode active material prepared as thus includes a porous carbon material having a plurality of pores that provide channels through which electrolyte ions are introduced or discharged and sulfur adsorbed onto the porous carbon material, wherein sulfur is preferably contained at 1.0 to 35.0% by weight of the sulfur-porous carbon composite material.

The cathode active material prepared as described above, a conductive material, a binder, and a dispersion medium are mixed together to form a cathode composition.

The cathode active material contains a porous carbon material having a plurality of pores that provide channels through which electrolyte ions are introduced or discharged and sulfur adsorbed onto the porous carbon material. The cathode active material has a large specific surface area by exhibiting porosity, and, by being porous, the cathode active material can enhance the energy density and power density of the lithium-sulfur ultracapacitor. The cathode active material exhibits porosity due to a plurality of pores distributed throughout the surface and bulk of the particles. When such a cathode active material is used to prepare the cathode 120 of the lithium-sulfur ultracapacitor, the reaction active site with the electrolyte can be maximized due to the porous structure, resulting in an improved power density.

When the cathode active material is used in a lithium-sulfur ultracapacitor, lithium ions can be physically adsorbed onto or desorbed from both the surface and bulk of the cathode active material through the plurality of pores during charging or discharging operations. The physical adsorption and desorption of lithium ions may take place not only on the surface of the cathode active material but also through the pores formed in the bulk and deep inside the cathode active material.

The conductive material is not limited to a particular type, as long as it is an electrically conductive material not causing a chemical change, and examples thereof may include carbon black, acetylene black, Ketjen black, Super P, carbon fibers, and metal powders or metal fibers of copper, nickel, aluminum, and silver. The conductive material is preferably mixed at 1 to 35 parts by weight with respect to 100 parts by weight of the cathode active material.

The binder may be polytetrafluoroethylene (PTFE), polyvinylidene fluoride (PVDF), carboxymethyl cellulose (CMC), polyvinyl alcohol (PVA), polyvinyl butyral (PVB), poly(N-vinylpyrrolidone) (PVP), styrene-butadiene rubber (SBR), polyamide-imide, polyimide, a mixture thereof, or the like. The binder is preferably mixed at 1 to 25 parts by weight with respect to 100 parts by weight of the cathode active material.

The dispersion medium may be an organic solvent, such as ethanol (EtOH), acetone, isopropyl alcohol, N-methyl-2-pyrrolidone (NMP), and propylene glycol (PG), or water. The dispersion medium is preferably mixed at 200 to 500 parts by weight with respect to 100 parts by weight of the cathode active material.

For the homogeneous mixing of the cathode active material, the conductive material, and the binder, a high-speed mixer may be used for a predetermined time (for example, for 1 minute to 24 hours) for stirring, and a cathode composition suitable for the preparation of an electrode (cathode 120) may be obtained as the result. The stirring is preferably performed at a rotation speed of about 100 to 4,000 rpm.

The cathode composition prepared as thus is in a slurry form.

The cathode composition obtained by mixing the cathode active material, the binder, the conductive material, and the dispersion medium is formed into a shape of an electrode. For example, the cathode composition may be formed into a shape of an electrode by rolling into a sheet or by pressing with a roll press molding machine, the cathode composition that has been formed into a shape of an electrode is dried at a temperature of 80 to 350° C., and the cathode composition that has been dried is punched or cut into a desired size to prepare a cathode 120 having a desired shape (for example, a sheet).

To describe an example of preparing a cathode 120 of a lithium-sulfur ultracapacitor in greater detail, the cathode composition may take shape by pressing with a roll press molding machine. The roll press molding machine aims to enhance the electrode density and control the electrode thickness by rolling, and is configured of a controller capable of controlling the upper and lower rolls, roll thicknesses, and heating temperature and a winding unit capable of rolling and unrolling the electrode. The rolling process is carried out as an electrode in a rolled state passes through the roll press, and the electrode is again rolled into a roll. In this case, the pressing pressure of the press is preferably set to 5 to 20 tons/cm$^2$ and the roll temperature is preferably set to 0 to 150° C. The cathode composition that has undergone the above pressing process is subjected to a drying process. The drying process is carried out at a temperature of 80 to 350° C., and preferably at a temperature of 100 to 150° C. In this case, a drying temperature less than 80° C. is not preferable because the dispersion medium does not evaporate easily at such a temperature, and high-temperature drying at a temperature greater than 350° C. is not preferable, as it may cause the conductive material to be oxidized. Therefore, preferably, the drying temperature is 80° C. or more but no more than 350° C. Also, the drying process is preferably carried out for about 10 minutes to 6 hours at the aforementioned temperature. Such a drying process dries (evaporates the dispersion medium) the cathode composition that has been roll-pressed, enhancing the toughness of the cathode at the same time by binding powder particles together. The cathode composition that has been dried is punched or cut into a desired size to prepare an electrode having a desired shape (for example, a sheet). The cathode 120 prepared as thus preferably has a thickness of about 10 to 500 μm.

The graphite-based electrode 110b is prepared using a graphite-based powder as an electrode active material.

Hereinafter, a method of preparing the graphite-based electrode 110 will be described in greater detail.

A graphite-based electrode composition is prepared by mixing an electrode active material, a conductive material, a binder, and a dispersion medium.

The electrode active material may contain a graphite-based powder. The graphite-based powder is not limited to a particular type, and may be based on natural graphite, artificial graphite, soft-carbon-based graphite, hard-carbon-based graphite, or a mixture thereof. It is preferable to use a graphite-based powder having an average particle diameter of 0.5 to 20 μm to facilitate electrode formation and particle dispersion. The artificial graphite is prepared by mixing a coke (a solid carbon fuel prepared through the dry distillation of coal) powder and a binder, carbonizing the mixture by baking, and reheating the carbonized substances at a temperature in a range of 2,500 to 3,000° C. in an electric furnace, and is a highly crystalline carbon material. The soft-carbon-based graphite and the hard-carbon-based graphite are low crystalline carbon materials. The soft-carbon-based graphite is a carbon material that easily graphitizes by heat-treating at a temperature in a range of 1,800 to 2,000° C. due to small graphite crystals clustered in an orderly manner. The hard-carbon-based graphite is a carbon material containing small graphite crystals clustered in a disorderly fashion, and thus cannot easily graphitize any further and form a layered structure.

The conductive material is not limited to a particular type, as long as it is an electrically conductive material not causing a chemical change, and examples thereof may include carbon black, acetylene black, Ketjen black, Super P, carbon fibers, and metal powders or metal fibers of copper, nickel, aluminum, and silver. The conductive material is preferably mixed at 1 to 35 parts by weight with respect to 100 parts by weight of the cathode active material.

The binder may be PTFE, PVDF, CMC, PVA, PVB, PVP, SBR, polyamide-imide, polyimide, a mixture thereof, or the like. The binder is preferably mixed at 1 to 25 parts by weight with respect to 100 parts by weight of the cathode active material.

The dispersion medium may be an organic solvent, such as EtOH, acetone, isopropyl alcohol, NMP, and PG, or water. The dispersion medium is preferably mixed at 200 to 500 parts by weight with respect to 100 parts by weight of the cathode active material.

For the homogeneous mixing of the cathode active material, the conductive material, and the binder, a high-speed mixer may be used for a predetermined time (for example, for 1 minute to 24 hours) for stirring, and a graphite-based electrode composition suitable for the preparation of an electrode (graphite-based electrode 110b) may be obtained as the result. The stirring is preferably performed at a rotation speed of about 100 to 4,000 rpm.

The graphite-based electrode composition prepared as thus is in a slurry form.

The graphite-based electrode composition obtained by mixing the electrode active material, the binder, the conductive material, and the dispersion medium is formed into a shape of an electrode. For example, the graphite-based electrode composition may be formed into a shape of an electrode by rolling into a sheet or by pressing with a roll press molding machine, the graphite-based electrode composition that has been formed into a shape of an electrode is dried at a temperature of 80 to 350° C., and the graphite-based electrode composition that has been dried is punched or cut into a desired size to prepare a graphite-based electrode 110b having a desired shape (for example, a sheet).

To describe an example of preparing a graphite-based electrode 110b of a lithium-sulfur ultracapacitor in greater detail, the graphite-based electrode composition may take a shape by pressing with a roll press molding machine. The roll press molding machine aims to enhance the electrode density and control the electrode thickness by rolling, and is configured of a controller capable of controlling the upper and lower rolls, roll thicknesses, and heating temperature and a winding unit capable of rolling and unrolling the electrode. The rolling process is carried out as an electrode in a rolled state passes through the roll press, and the electrode is again rolled into a roll. In this case, the pressing pressure of the press is preferably set to 5 to 20 tons/cm$^2$ and the roll temperature is preferably set to 0 to 150° C. The graphite-based electrode composition that has undergone the above pressing process is subjected to a drying process. The drying process is carried out at a temperature of 80 to 350° C., and preferably at a temperature of 100 to 150° C. In this case, a drying temperature less than 80° C. is not preferable because the dispersion medium does not evaporate easily at such a temperature, and high-temperature drying at a temperature greater than 350° C. is not preferable, as it may cause the conductive material to be oxidized. Therefore, preferably, the drying temperature is 80° C. or more but no more than 350° C. Also, the drying process is preferably carried out for about 10 minutes to 6 hours, at the aforementioned temperature. Such a drying process dries (evaporates the dispersion medium) the graphite-based electrode composition that has been roll-pressed, enhancing the toughness of the graphite-based electrode 110b at the same time by binding powder particles together. The graphite-based electrode composition that has been dried is punched or cut into a desired size to prepare an electrode having a desired shape (for example, a sheet). The graphite-based electrode 110b prepared as thus preferably has a thickness of about 10 to 500 μm.

A flat, plate-like electrode may be used as the lithium metal electrode 110a, and the area of the graphite-based electrode 110b and the area of the lithium metal electrode 110a preferably differ by less than 10%. The lithium metal electrode 110a preferably has a thickness of about 10 to 500 μm.

The lithium metal electrode 110a and the graphite-based electrode 110b constitute the anode 110 of the lithium-sulfur ultracapacitor.

The aforementioned cathode 120 and the aforementioned anode 110 may be usefully applied in a lithium-sulfur ultracapacitor having a desired shape.

The cathode 120, the separator 160, the lithium metal electrode 110a, and the graphite-based electrode 110b are disposed inside the case 190. The lithium metal electrode 110a is disposed on the opposite side of the cathode 120 with respect to the separator 160, and the graphite-based electrode 110b is disposed adjacent to the lithium metal electrode 110a. In the lithium-sulfur ultracapacitor, the lithium metal electrode 110a and the graphite-based electrode 110b constitute the anode 110. As described above, the cathode 120 is a cathode 120 prepared using a sulfur-porous carbon composite material as the cathode active material, and the graphite-based electrode 110b is an electrode prepared using a graphite-based powder as the electrode active material.

The separator 160 is not limited to a particular type, as long as it is a separator commonly used in the field of ultracapacitors. Examples of such a separator include polyethylene nonwoven fabrics, polypropylene nonwoven fabrics, polyester nonwoven fabrics, porous polyacrylonitrile separators, porous poly(vinylidene fluoride-co-hexafluoropropane) copolymeric separators, porous cellulose separators, kraft paper, and rayon fibers.

An electrolyte may be injected such that the cathode 120, the lithium metal electrode 110a, and the graphite-based electrode 110b are impregnated with the electrolyte, and, by subsequently sealing the case, the lithium-sulfur ultracapacitor can be prepared.

The electrolyte may be an electrolyte in which a lithium salt is dissolved in a non-aqueous solvent at a concentration of 0.1 to 2.0 M, and the lithium salt may be $LiPF_6$, $LiBF_4$, $LiSbF_6$, $LiAsF_6$, $LiClO_4$, $LiNO_3$, $LiCF_3SO_3$, LiTFSI, $LiN(C_2F_5SO_2)_2$, $LiAlO_4$, $LiAlCl_4$, or a mixture thereof.

The non-aqueous solvent is not limited to a particular type, and examples of the non-aqueous solvent include cyclic carbonate-based solvents, chain carbonate-based solvents, ester-based solvents, ether-based solvents, nitrile-based solvents, amide-based solvents, or mixtures thereof. The cyclic carbonate-based solvent may be ethylene carbonate, propylene carbonate, butylene carbonate, vinylene carbonate, or the like, the chain carbonate-based solvent may be dimethyl carbonate, methyl ethyl carbonate, diethyl carbonate, or the like, the ester-based solvent may be methyl acetate, ethyl acetate, propyl acetate, methyl propionate, ethyl propionate, γ-butyrolactone, or the like, and the ether-based solvent may be 1,2-dimethoxyethane, 1,2-diethoxyethane, tetrahydrofuran, 1,2-dioxane, 2-methyl tetrahydrofuran, dioxolane, or the like, the nitrile-based solvent may be acetonitrile or the like, the amide-based solvent may be dimethylformamide or the like.

FIG. 1 illustrates a coin-type ultracapacitor as an example of the lithium-sulfur ultracapacitor according to an exemplary embodiment of the present invention. However, the lithium-sulfur ultracapacitor according to an exemplary embodiment of the present invention may also be prepared into a roll-type ultracapacitor as illustrated in FIGS. 2 to 5.

Hereinafter, a method of preparing a roll-type ultracapacitor will be described in detail with reference to FIGS. 2 to 5.

Figure 2:
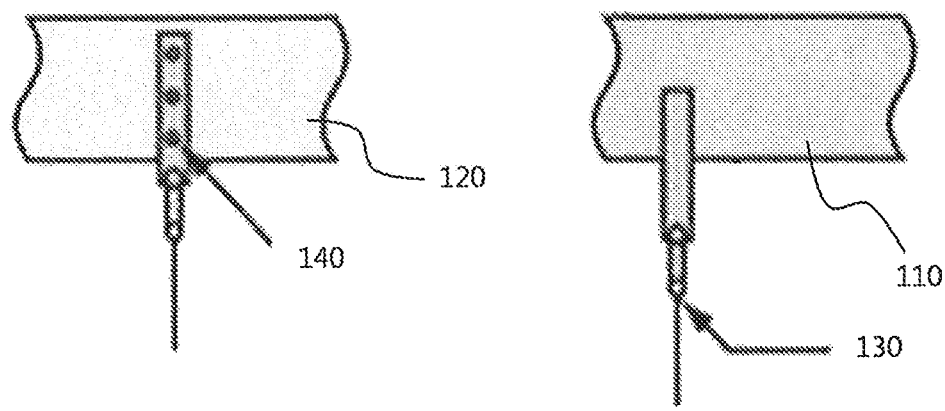
FIGS. 2 to 5 illustrate a lithium-sulfur ultracapacitor according to another exemplary embodiment of the present invention for descriptive purposes.

As illustrated in FIG. 2, lead wires 130, 140 are connected to the aforementioned anode 110 and the aforementioned cathode 120, respectively. In this case, the anode 110 is composed of the lithium metal electrode 110a and the graphite-based electrode 110b, one of which is stacked on top of the other.

Figure 3:
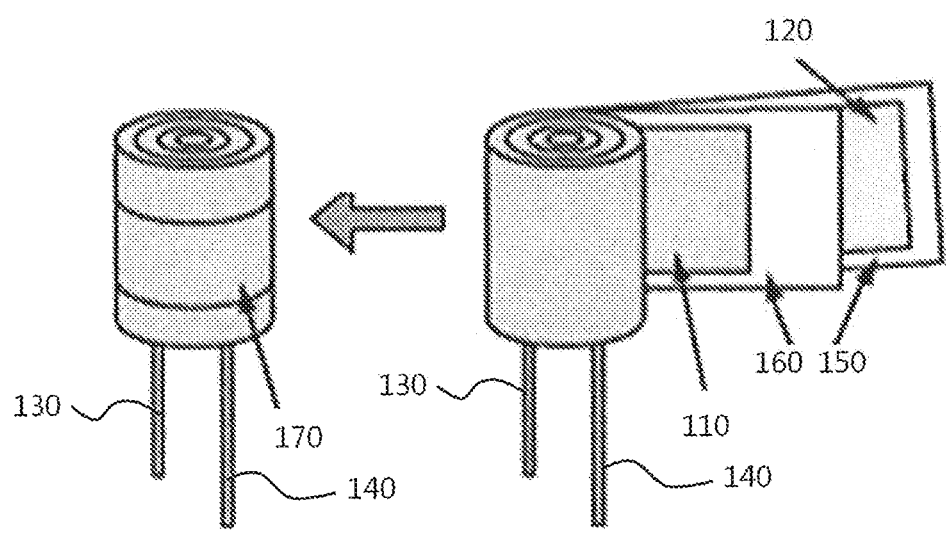

As illustrated in FIG. 3, a first separator 150, the cathode 120, a second separator 160, and the anode 110 are stacked together, what has been stacked together is coiled and prepared into a roll-type rolled device 175, and then the roll is bound by an adhesive tape 170 or the like such that it can be maintained in a rolled state.

The second separator 160 provided between the cathode 120 and the anode 110 prevents a short circuit between the cathode 120 and the anode 110. The first separator 150 and the second separator 160 are not limited to a particular type, as long as they are separators commonly used in the fields of batteries and capacitors. Examples of such separators include polyethylene nonwoven fabrics, polypropylene nonwoven fabrics, polyester nonwoven fabrics, porous polyacrylonitrile separators, porous poly(vinylidene fluoride-co-hexafluoropropane) copolymeric separators, porous cellulose separators, kraft paper, and rayon fibers.

Figure 4:
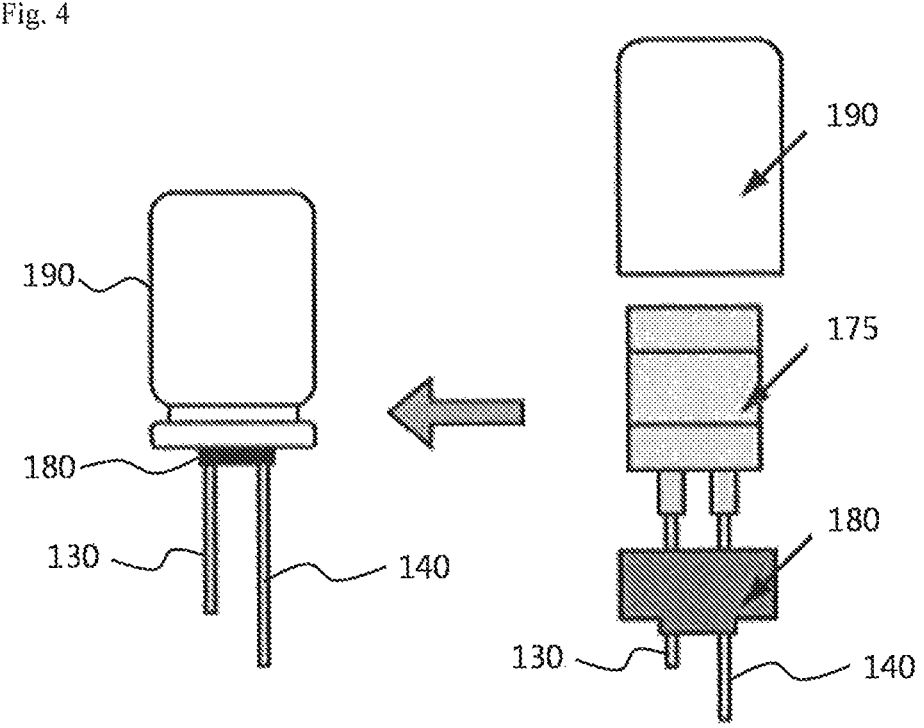

As illustrated in FIG. 4, a sealing rubber 180 is installed on the roll-type product, and both are inserted into the case 190.

An electrolyte is injected such that the roll-type rolled device 175 (or the cathode 120 and the anode 110) is impregnated with the electrolyte, and the case is sealed.

Figure 5:
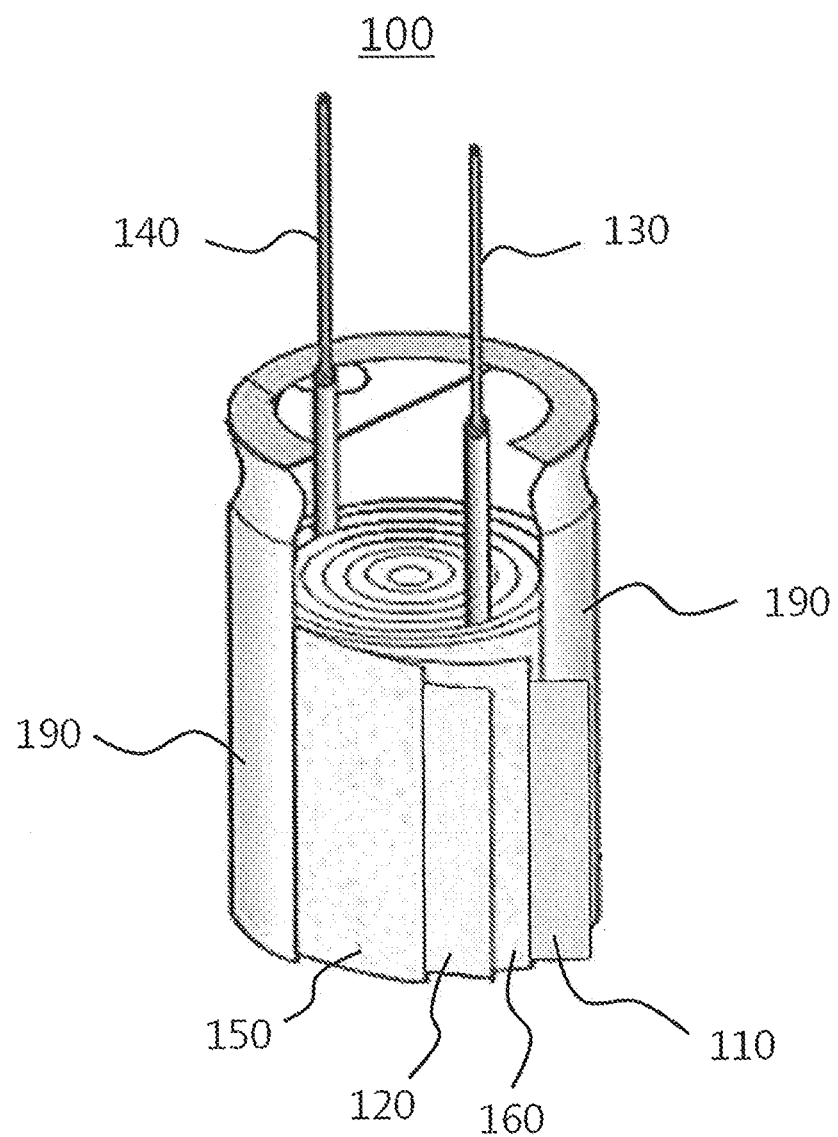

The roll-type ultracapacitor prepared as thus is schematically illustrated in FIG. 5.

Hereinafter, a test example according to the present invention will be described in detail, but the present invention is not limited by the following test example.

Test Example

To prepare the cathode active material, a phenol-based powder (a porous activated carbon powder) (product name MSP20 of Kansai Coke & Chemical Co.) and a sulfur powder (a product of Sigma-Aldrich Co. LLC.) were used. The porous activated carbon powder and the sulfur powder were mixed in a ratio of 80:20 by weight, and the mixture was heat-treated under an Ar gas atmosphere at 140° C. for 1 hour to obtain a sulfur-porous activated carbon composite material, which is the cathode active material.

To prepare the cathode, the cathode active material (the sulfur-porous activated carbon composite material), a conductive material, and a binder were mixed in a ratio of 90:5:5 by weight in an EtOH-based dispersion medium, and the mixture was formed into a sheet by rolling (formed into a rubber-type electrode) and was dried at 120° C. Super P was used as the conductive material, and PTFE was used as the binder. What was prepared by punching the dried product into a diameter of 12 mm was used as the cathode.

To prepare the graphite-based electrode, an electrode active material (a graphite-based powder), a conductive material, and a binder were mixed in a ratio of 90:5:5 by weight in an EtOH-based dispersion medium, and the mixture was formed into a sheet by rolling (formed into a rubber-type electrode) and was dried at 120° C. Artificial graphite (GRAMX-S80 of Osaka Gas Co. Ltd.) was used as the graphite-based powder, Super P was used as the conductive material, and PTFE was used as the binder. What was prepared by punching the dried product into a diameter of 12 mm was used as the graphite-based electrode.

As illustrated in FIG. 1, the cathode and the graphite-based electrode were disposed apart from each other inside a case, a separator was disposed between the cathode and the graphite-based electrode, and a lithium metal electrode was disposed between the graphite-based electrode and the separator in such a way that the lithium metal electrode was adjacent to the graphite-based electrode. An electrolyte in which a lithium salt was dissolved was injected such that the cathode, the graphite-based electrode, and the lithium metal electrode could be impregnated with the electrolyte, and the case was sealed with a cap to complete the preparation of the lithium-sulfur ultracapacitor. An electrolyte prepared by dissolving lithium nitrate ($LiNO_3$) at 0.2 M in a 1 M solution of LiTFSI in dimethoxyethane and 1,3-dioxolane, wherein the dimethoxyethane and the 1,3-dioxolane were mixed in a ratio of 1:1 by volume, was used as the electrolyte. A porous, cellulose-based separator was used as the separator.

The lithium-sulfur ultracapacitor prepared as thus was charged and discharged using an electric current equivalent to 1 mA per unit area and a voltage range of 1.5 to 3.8 V.

Figure 6:
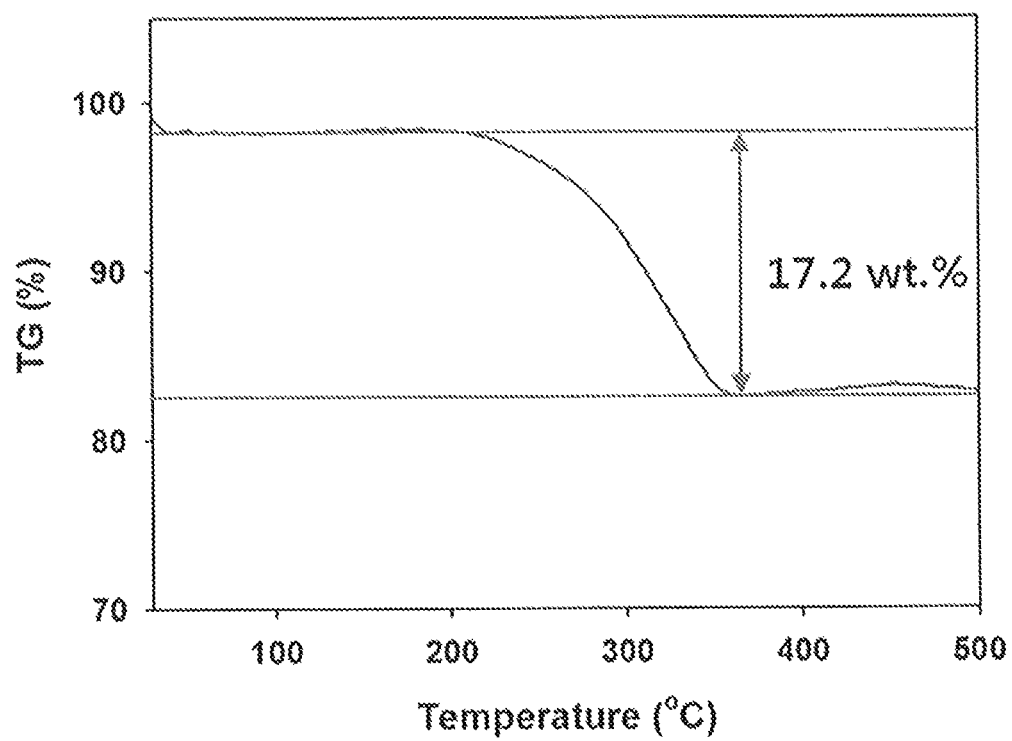
FIG. 6 is a graph for showing the result of thermogravimetric (TG) analysis carried out under a nitrogen gas atmosphere to determine the sulfur content in a sulfur-porous carbon composite material prepared according to a test example.

FIG. 6 is a graph for showing the result of thermogravimetric (TG) analysis carried out under a $N_2$ gas atmosphere to determine the sulfur content in a sulfur-porous carbon composite material prepared according to the Test Example.

Referring to FIG. 6, it can be seen that sulfur was contained at about 17.2% by weight of the sulfur-porous activated carbon composite material.

Figure 7:
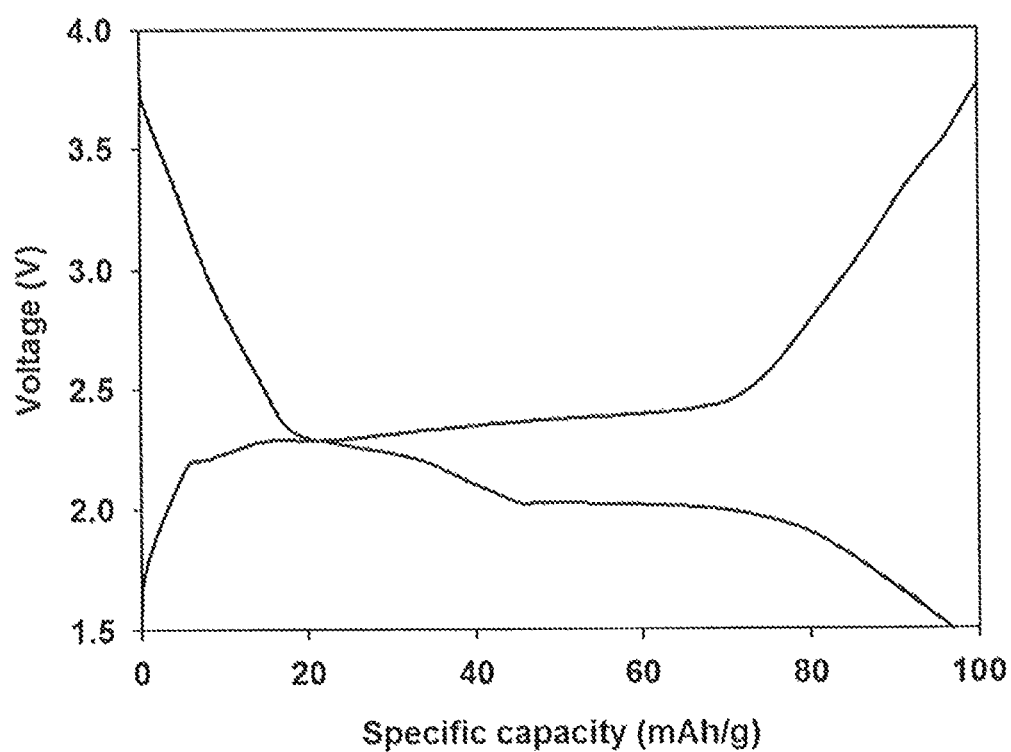
FIG. 7 is a graph for showing charging and discharging profiles of the sulfur-porous carbon composite material prepared according to a test example.

FIG. 7 is a graph for showing charging and discharging profiles of the sulfur-porous carbon composite material prepared according to the Test Example. The charging and discharging were carried out using an electric current that equals to 1 mA per unit area and a voltage range of 1.5 to 3.8 V.

Referring to FIG. 7, the lithium-sulfur ultracapacitor prepared according to the Test Example was found to have excellent charging and discharging properties.

While exemplary embodiments of the present invention have been described above, it will be understood that the exemplary embodiments of the present invention are not limited to the above examples and that those skilled in the art may variously modify and make changes to the exemplary embodiments without departing from the spirit and scope of the present invention.

| Description of Reference Numerals | |
|---|---|
| 110: ANODE | 110A: LITHIUM METAL ELECTRODE |
| 110B: GRAPHITE-BASED ELECTRODE | 120: CATHODE |
| 130: FIRST LEAD WIRE | 140: SECOND LEAD WIRE |
| 150: FIRST SEPARATOR | 160: SECOND SEPARATOR |
| 170: ADHESIVE TAPE | 175: ROLLED DEVICE |
| 180: SEALING RUBBER | 190: CASE |
| 192: GASKET | 194: CAP |
| 196: WASHER | 198: SPACER |

What is claimed is:

1. A method of preparing a lithium-sulfur ultracapacitor, the method comprising:
    preparing a cathode using a sulfur-porous carbon composite material as a cathode active material;
    preparing a graphite-based electrode using a graphite-based powder as an electrode active material;
    disposing the cathode, a separator, a lithium metal electrode, and the graphite-based electrode inside a case; and
    injecting an electrolyte such that the cathode, the lithium metal electrode, and the graphite-based electrode are impregnated with the electrolyte and sealing the case,
    wherein the lithium metal electrode is disposed on an opposite side of the cathode with respect to the separator, the graphite-based electrode is disposed adjacent to the lithium metal electrode, and the lithium metal electrode and the graphite-based electrode constitute an anode,
    wherein the sulfur-porous carbon composite material is prepared by a method comprising:
    mixing a porous carbon material and sulfur; and heat-treating the mixed porous carbon material and sulfur under an inert atmosphere at a temperature higher than a melting point of sulfur and lower than a boiling point of sulfur, wherein the sulfur-porous carbon composite material includes:

a porous carbon material having a plurality of pores that provide channels through which lithium ions are introduced or discharged; and sulfur adsorbed onto a surface and pores of the porous carbon material, wherein sulfur is contained at 1.0 to 35.0% by weight of the sulfur-porous carbon composite material.

2. The method of claim 1, wherein the lithium metal electrode is a flat, plate-like electrode, and an area of the graphite-based electrode and an area of the lithium metal electrode differ by less than 10%.

3. The method of claim 1, wherein the electrolyte is an electrolyte in which a lithium salt is dissolved in a non-aqueous solvent at a concentration of 0.1 to 2.0 M, wherein the lithium salt is $LiPF_6$, $LiBF_4$, $LiSbF_6$, $LiAsF_6$, $LiClO_4$, $LiNO_3$, $LiCF_3SO_3$, $LiN(CF_3SO_2)_2$, $LiN(C_2F_5SO_2)_2$, $LiAlO_4$, $LiAlCl_4$, or a mixture thereof.

4. A method of preparing a lithium-sulfur ultracapacitor, the method comprising:

preparing a cathode using a sulfur-porous carbon composite material as a cathode active material;

preparing a graphite-based electrode using a graphite-based powder as an electrode active material;

disposing the cathode, a separator, a lithium metal electrode, and the graphite-based electrode inside a case; and injecting an electrolyte such that the cathode, the lithium metal electrode, and the graphite-based electrode are impregnated with the electrolyte and sealing the case, wherein the lithium metal electrode is disposed on an opposite side of the cathode with respect to the separator, the graphite-based electrode is disposed adjacent to the lithium metal electrode, and the lithium metal electrode and the graphite-based electrode constitute an anode, wherein the preparing of a cathode comprises:

preparing a cathode composition by mixing the cathode active material, a conductive material, a binder, and a dispersion medium;

forming the cathode composition into a sheet;

drying the cathode composition, which has been formed into a sheet, at a temperature in a range of 80° C. to 350° C.; and forming a sheet-type electrode by punching or cutting the cathode composition, which has been dried, into a desired size, wherein the conductive material is mixed at 1 to 35 parts by weight with respect to 100 parts by weight of the cathode active material, and the binder is mixed at 1 to 25 parts by weight with respect to 100 parts by weight of the cathode active material.

5. A method of preparing a lithium-sulfur ultracapacitor, the method comprising:

preparing a cathode using a sulfur-porous carbon composite material as a cathode active material;

preparing a graphite-based electrode using a graphite-based powder as an electrode active material;

disposing the cathode, a separator, a lithium metal electrode, and the graphite-based electrode inside a case; and injecting an electrolyte such that the cathode, the lithium metal electrode, and the graphite-based electrode are impregnated with the electrolyte and sealing the case, wherein the lithium metal electrode is disposed on an opposite side of the cathode with respect to the separator, the graphite-based electrode is disposed adjacent to the lithium metal electrode, and the lithium metal electrode and the graphite-based electrode constitute an anode, wherein the porous carbon material has a pore volume of 0.5 to 5.0 cm3/g.

6. A method of preparing a lithium-sulfur ultracapacitor, the method comprising:

preparing a cathode using a sulfur-porous carbon composite material as a cathode active material;

preparing a graphite-based electrode using a graphite-based powder as an electrode active material;

disposing the cathode, a separator, a lithium metal electrode, and the graphite-based electrode inside a case; and injecting an electrolyte such that the cathode, the lithium metal electrode, and the graphite-based electrode are impregnated with the electrolyte and sealing the case, wherein the lithium metal electrode is disposed on an opposite side of the cathode with respect to the separator, the graphite-based electrode is disposed adjacent to the lithium metal electrode, and the lithium metal electrode and the graphite-based electrode constitute an anode, wherein the preparing of a graphite-based electrode comprises:

preparing a graphite-based electrode composition by mixing the electrode active material, a conductive material, a binder, and a dispersion medium;

forming the graphite-based electrode composition into a sheet;

drying the graphite-based electrode composition, which has been formed into a sheet, at a temperature in a range of 80° C. to 350° C.; and forming a sheet-type electrode by punching or cutting the graphite-based electrode composition, which has been dried, into a desired size, wherein the conductive material is mixed at 1 to 35 parts by weight with respect to 100 parts by weight of the electrode active material, the binder is mixed at 1 to 25 parts by weight with respect to 100 parts by weight of the electrode active material, and the electrode active material includes a graphite-based powder, wherein the graphite-based powder is based on natural graphite, artificial graphite, soft-carbon-based graphite, hard-carbon-based graphite, or a mixture thereof, and the graphite-based powder has an average particle diameter of 0.5 to 20 μm.

* * * * *